Jan. 2, 1934. F. FILLO 1,941,546
STEP CONTROL SYSTEM
Filed May 22, 1931 3 Sheets-Sheet 1

INVENTOR
FRANCIS FILLO
ATTORNEYS

Patented Jan. 2, 1934

1,941,546

UNITED STATES PATENT OFFICE 1,941,546

STEP CONTROL SYSTEM

Francis Fillo, St. Louis, Mo., assignor to Minneapolis-Honeywell Regulator Company, Minneapolis, Minn., a corporation of Delaware Application May 22, 1931. Serial No. 539,307

27 Claims. (Cl. 236—78)

This invention relates to electrical remote control systems. More particularly it concerns itself with systems for arranging a plurality of controlled objects in a plurality of settings, each of which comprises an arrangement of the controlled objects in predetermined relative positions. It is a general object of the invention to provide a simplified system wherein desired settings of the controlled objects may be effected by means of a central control member moving along a predetermined path of travel, there being means associated with the control member for effecting the different settings at different points in its path of travel. Each of the settings of the controlled objects may be used, for instance, to effect a stage or step in the control of an element or system being controlled by means of the aforementioned controlled objects, so that a step by step control of such element or system will result upon movement of the central control member along its path of travel.

In one of the simplified forms of the invention the controlled objects are each arranged for movement between two fixed positions of rest, one of which is normally assumed and held by each controlled object whereas the other is only assumed and held under the influence of some outside actuating force and holding means. Means associated with the control member are further provided for rendering the separate actuating and holding means for the various controlled objects operative or inoperative as the case may be, when the control member reaches various spaced points in its path of travel. In this way, various settings each comprising some specified arrangement of the controlled members with respect to each other are effected upon actuation of the control member. For example, the controlled objects may constitute relay elements adapted to move between two fixed positions of rest, one of which is always assumed and held when the relay is de-energized and the other of which is only assumed and held when the relay is energized. Each of the relays may have an energizing circuit which is opened and closed by the central control member. Assuming that one desired setting constitutes the arrangement of all of the controlled members in the positions they assume when their respective relays are de-energized, provision is made for opening all of the relay energizing circuits when the control member reaches some predetermined point in its path of travel. Again, if a desired setting requires one relay to be energized and the remaining relays to be de-energized, provision is made for closing the circuit of the relay to be energized while maintaining the circuits of the others open at some point in the path of travel of the control member. Thus, various settings of the controlled members may be affected upon movement of the control member along its path of travel.

The present system is particularly adapted for use in connection with a control member which moves back and forth in response to some condition which it is desired to control. For example, the control member may be responsive to changes in the temperature of its surrounding medium and may constitute the well known bi-metallic strip or any other convenient type of thermostat such as one fluid or pressure operated. Where a heating plant is the ultimate object of control it is frequently desirable to initially institute a setting of the controlled members when the thermostat reaches a predetermined point during temperature fall, which setting is to be maintained during a specified temperature rise beyond the temperature at which it was instituted. It is therefore a further object of the invention to provide means in a step control system for instituting a desired setting of the controlled members when the control member reaches a specified point, and for maintaining such setting within a predetermined zone of travel of the control member away from such point.

These and other objects of the invention will become more readily apparent upon a reading of the drawings and specification together with the appended claims.

In the drawings, which are illustrative of the invention and wherein like elements have been given like reference numerals in the various figures, Fig. 1 is a diagramatic showing of one form of circuit wherein the controlled members serve to regulate a unit heater;

Figure 1:
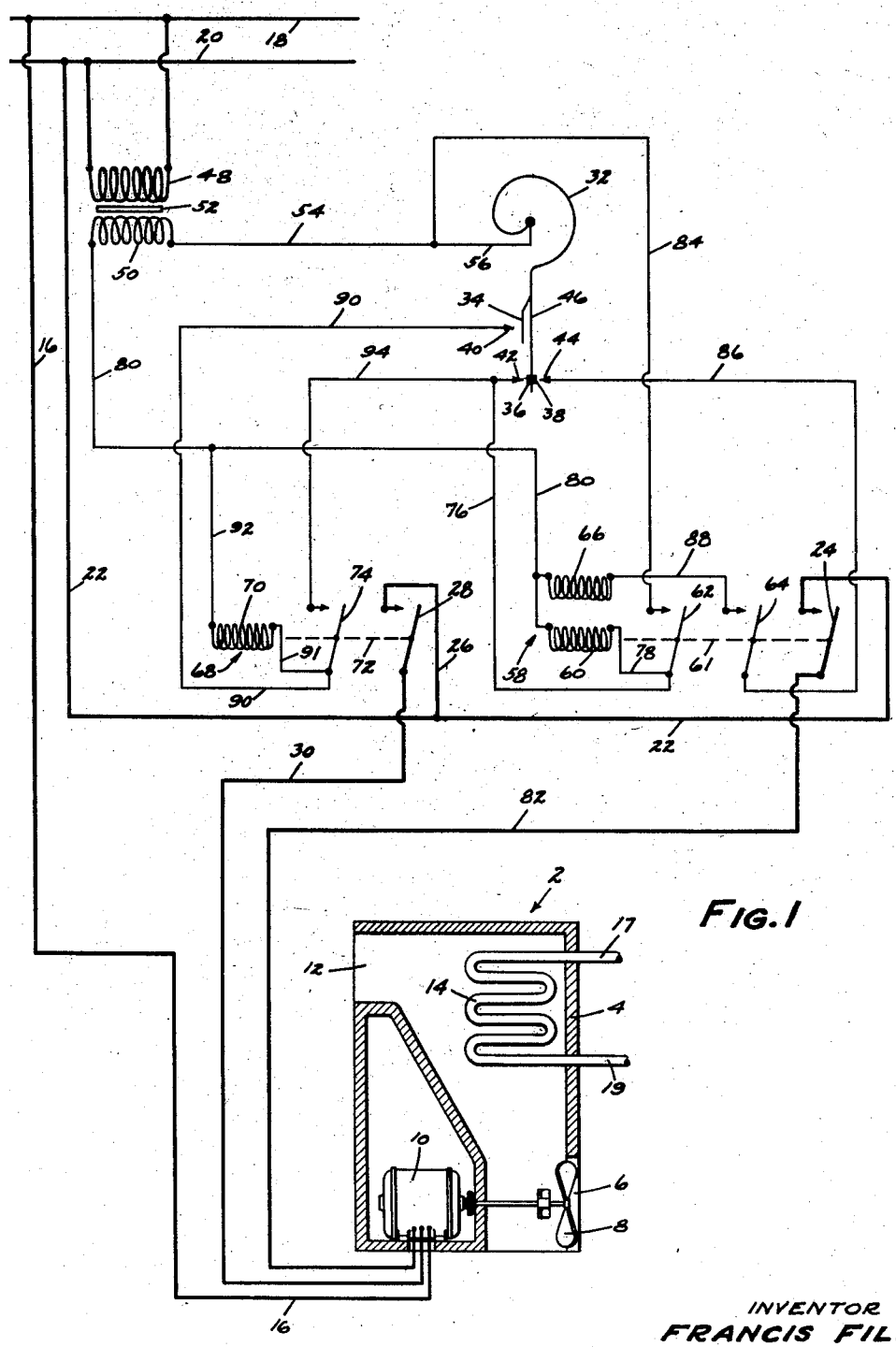

The unit heater generally designated at 2 is shown as comprising a casing 4 having an inlet 6 controlled by a fan 8 operated by motor 10, and an outlet 12 comunicating with a room or the like which is to be heated. Steam or other heating medium is supplied to the heat exchange coil 14 through inlet 17 and outlet 19. In the operation of the heater, air is drawn into the air inlet opening 6 by means of fan 8 and after sweeping around the windings of the coil 14 is delivered to the room or other space to be heated through the outlet 12. If the temperature within the room to be heated falls, additional air must be drawn through the device and the motor 10 must accordingly be speeded up but it will be apparent that the motor 10 may remain stationary when the room is at the temperature which it is desired to maintain. For slight drops in temperature it is desirable to operate the motor 10 only at half speed whereas in the case of a relatively large drop in the temperature below that which it is desired to maintain, it is desirable to operate motor 10 at full speed.

The motor 10 is connected to a wire 16 leading to one side 18 of a line communicating with a source of elctrical energy. The other side 20 of this line is connected to a wire 22 leading to the motor through the switch 24. Wire 26 is tapped off from the wire 22 and leads to switch 28 which is connected to a wire 30 also leading to a different contact on the motor 10. The connections with the motor are such that when switch 24 is closed and switch 28 is open the motor 10 will operate at half speed whereas it will operate at full speed when switch 28 is closed. This can readily be accomplished by placing a resistance in the circuit controlled by switch 24 which resistance would be shorted out upon closure of switch 28. When both switches 24 and 28 are open no current will of course flow to the motor and the fan will remain stationary.

The control member in this case comprises a thermally responsive bi-metallic element 32 which carries a contact 34 on the left, and a pair of contacts 36 and 38 at either side of its lowermost portion. The contacts 34, 36 and 38 are adapted to engage the stationary contacts 40, 42 and 44 respectively, upon movement of the stem 46 of the bi-metallic element 32.

For purposes of illustration it may be assumed that the bi-metallic element will asume the position shown in Fig. 1 at the temperature which it is desired to maintain, for instance, 70 degrees F. As the temperature begins to fall contacts 36 and 42 will first engage, say at 68 degrees F., and as the temperature continues to fall, for instance to 66 degrees F., the contacts 34 and 40 will engage while contacts 36 and 42 remain in engagement. When the temperature rises above 70 degrees the contacts 34 and 36 will both have become disengaged and contact 38 will engage contact 44.

A transformer having a primary 48 connected to the line has a secondary 50 and is provided with the usual core 52. One side of the secondary is connected to the bi-metallic element 32 by means of wire 54 and wire 56. The relay generally designated at 58 is provided with a coil 60 co-operating with armature 61 to operate the switches 62, 64 and 24. Coil 66 is arranged to neutralize the flux of the relay coil 60 when energized. The relay generally designated at 68 is provided with a relay coil 70 having an armature 72 operating the switches 74 and 28. When coils 60 and 70 are energized and the flux of the former is not neutralized, they will pull and hold their respective armatures 61 and 72 to the left, thereby closing the switches connected to the armatures but when the coils are de-energized or if the flux of the former is neutralized, their respective armatures will move to the right to open the switches. The movement to the right may be under the influence of gravity.

The following examples will serve to illustrate the operation of the device. When the bi-metallic element 32 is in the position shown in Fig. 1 and relays 58 and 68 are both open, as shown, the switches 24 and 28 will both be open and no current will flow to the motor 10. If a drop in temperature sufficient to move the stem 46 of the thermostat to the left and close contacts 36 and 42 occurs, the following circuit will be set up for initially energizing the coil 60 of the relay 58: secondary of transformer 50, wire 54, wire 56, bi-metallic element 32, contact 36, contact 42, wire 76, wire 78, relay coil 60, wire 80, secondary of transformer 50. When the coil 60 is energized the armature 61 will be moved to the left and switches 62, 64 and 24 will be closed. The closing of switch 24 will set up the following circuit for the motor: side of line 20, wire 22, switch 24, wire 82, motor 10, wire 16, side of line 18. This circuit will operate the motor at half speed as previously explained.

The closing of switch 62 will set up the following holding circuit for the relay 58: secondary of transformer 50, wire 54, wire 84, switch 62, wire 78, relay coil 60, wire 80, secondary 50. If the temperature in the room now rises as a result of the operation of motor 10 at half speed, and causes the stem 46 of the thermostat to move to the right away from contact 42, the relay coil 60 will still be energized through its holding circuit and the switches 62, 64 and 24 will remain closed even though the contacts 36 and 42 become separated for the holding circuit is independent of the relay control switch comprising contacts 36 and 42. Motor 10 will thus continue to operate after contacts 36 and 42 are separated. If it now be assumed that the temperature continues to rise until contact 38 engages contact 44, the following circuit will be set up through coil 66: secondary of transformer 50, wire 54, wire 56, bi-metallic element 32, contact 38, contact 44, wire 86, switch 64, wire 88, neutralizing coil 66, wire 80, secondary 50. When coil 66 becomes energized, it will neutralize the flux of coil 60 whereupon armature 61 will move to the right and switches 62, 64 and 24 will open. The opening of switch 24 disconnects motor 10 from the line. The opening of switch 62 breaks the holding circuit for the coil 60, and relay 58 will not be energized again until the temperature drops sufficiently to move the stem 46 to the left into position to again cause contacts 36 and 42 to engage.

When the contacts 36 and 42 again engage the relay coil 60 will be initially energized as before, the switches 62, 64 and 24 will be closed, and a holding circuit for coil 60 will be set up through switch 62. If it now be assumed that the operation of the motor 10 at half speed is not sufficient to check the temperature drop with the result that stem 46 of the bi-metallic element continues to move to the left until contact 34 engages contact 40, the following circuit will be set up to initially energize coil 70 of relay 68: secondary of transformer 50, wire 54, wire 56, bi-metallic element 32, contact 34, contact 40, wire 90, wire 91, relay coil 70, wire 92, wire 80, secondary 50. When coil 70 is energized, the armature 72 will be drawn to the left to close switches 28 and 74 and the closing of switch 28 will set up the following circuit for the motor: side of line 20, wire 22, wire 26, switch 28, wire 30, motor 10, wire 16, side of line 18. This circuit will short out the resistance in the circuit through switch 24 so that motor 10 will operate at full speed.

Upon the closing of switch 74, the following holding circuit will be set up for relay coil 70:

secondary of transformer 50, wire 54, wire 84, switch 62, wire 76, wire 94, switch 74, wire 91, coil 70, wire 92, wire 80, secondary of transformer 50. It will be observed that the holding circuit for relay 68 is dependent upon the closure of switch 62 of the relay 58 but is independent of the closure of either of the relay control switches constituted by contact pair 34 and 40, and contact pair 36 and 42.

If it be assumed that the full speed operation of the motor 10 is sufficient to raise the temperature surrounding the bi-metallic element 32 and cause it to move to the right until contacts 34 and 40 separate, relays 68 and 58 will nevertheless both remain energized as before. As the temperature continues to rise the stem 46 will continue to move to the right and separate contacts 36 and 42 but relays 58 and 68 will still remain energized through their holding circuits and motor 10 will continue to operate at full speed. If the temperature then becomes sufficiently high to cause contacts 38 and 44 to engage, neutralizing coil 66 will be energized and armature 61 will move to the right to open switches 62, 64 and 24, as previously explained. Upon the opening of switch 62, the holding circuit for relay 68 will be broken. The armatures of both relays will therefore move to the right as soon as contacts 38 and 44 engage. Consequently, the motor control switches 24 and 28 will both be opened at this instant and the fan 8 will remain idle until the temperature again falls. Inasmuch as contact pairs 34 and 40, 36 and 42, and 44 and 38 control the relays, they may all be conveniently referred to as relay control switches.

Figure 2:
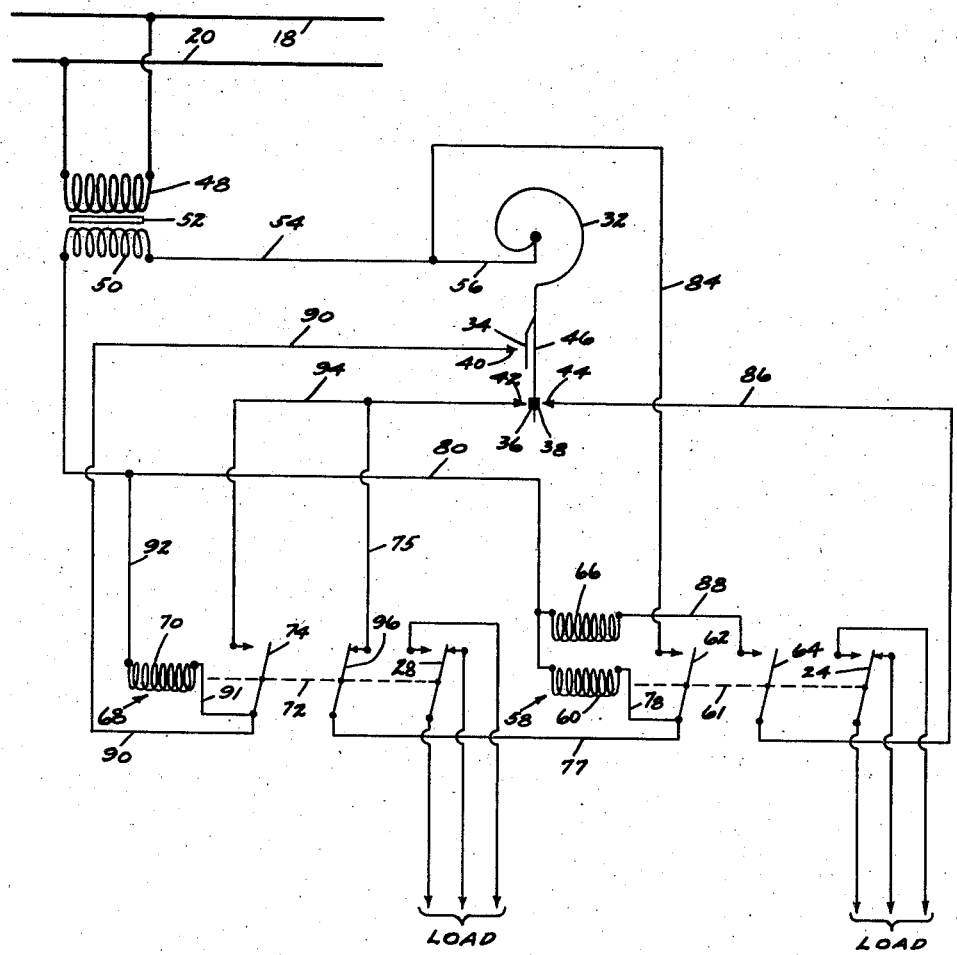
Fig. 2 shows a modified form of the control circuit shown in Fig. 1.

The arrangement for controlling the relays shown in Fig. 2 is identical with that shown in Fig. 1 with the exception that the holding circuit for coil 70 of the relay 68 includes a switch 96 operated by armature 72 of relay 68. The switch 96 is closed when the relay is de-energized and armature 72 is moved to the right, and opened when the relay is energized and its armature moved to the left. Upon comparison of Figs. 1 and 2 it will be observed that the only difference in the relay control circuits lies in the substitution of wire 76 of Fig. 1 by the wire 75, switch 96, and wire 77 in Fig. 2. The provision of the switch 96 within the holding circuit for coil 70 makes this circuit dependent upon the closing of the relay control switch constituted by contacts 36 and 42. As a consequence it will be broken as soon as the contacts 36 and 42 disengage.

In Fig. 2 the switches 24 and 28 are each shown as provided with double contacts so that each closes one circuit when its relay is energized and another circuit when its relay is de-energized. This type of double contact switch may be used, for example, in operating a pair of control circuits for a damper or the like which is to be moved between predetermined positions of rest in well known manner. However, it will be of course understood that this type of switch may be substituted by the simple type shown in Fig. 1 which merely opens and closes a single circuit. The relay may be used to operate any desired type of control switch.

The stem 46 of the bi-metallic element 32 takes the position shown in Fig. 2 when the temperature desired to be maintained exists, and let it be assumed that relay coils 70 and 60 are both de-energized under such a condition of temperature. In that case, armatures 61 and 72 will both be in their extreme right positions and the relay controlled switches will be in the positions shown in Fig. 2. If the temperature now falls a sufficient amount to cause contacts 36 and 42 to engage, relay coil 60 will be energized and armature 61 will move to the left thereby to close switches 62 and 64, and close switch 24 across its left contact. The circuit for initially energizing relay coil 60 comprises secondary of transformer 50, wire 54, wire 56, bi-metallic element 32, contact 36, contact 42, wire 75, switch 96, wire 77, wire 78, coil 60, wire 80, and secondary 50. When the switch 62 is closed, a holding circuit for coil 60 will be set up therethrough just as in the circuit shown in Fig. 1.

If the temperature then continues to drop until contacts 34 and 40 come into engagement, relay 68 will be initially energized through the same circuit as in Fig. 1 and armature 72 will move to the left to close switch 74, open switch 96, and close switch 28 across its left contact. Upon the closing of switch 74 the following holding circuit will be set up for relay 68: secondary of transformer 50, wire 54, wire 56, bi-metallic element 32, contact 36, contact 42, wire 94, switch 74, wire 91, relay coil 70, wire 92, wire 80, secondary 50. Should the stem 46 now move to the right so as to separate contacts 34 and 40, relay 68 will nevertheless remain energized through its holding circuit as long as contacts 36 and 42 are in engagement. As soon as contacts 36 and 42 disengage, however, the holding circuit for relay 68 will be broken for no current can flow to coil 70 from switch 62 because switch 96 will be open. Armature 72 will therefore move to the right to open switch 74, close switch 96, and close switch 28 across its right contact. Relay 58 will not be de-energized, however, until continued movement of the stem 46 to the right causes contacts 38 and 44 to come into engagement and close the circuit for the neutralizing coil 66.

Figure 3:
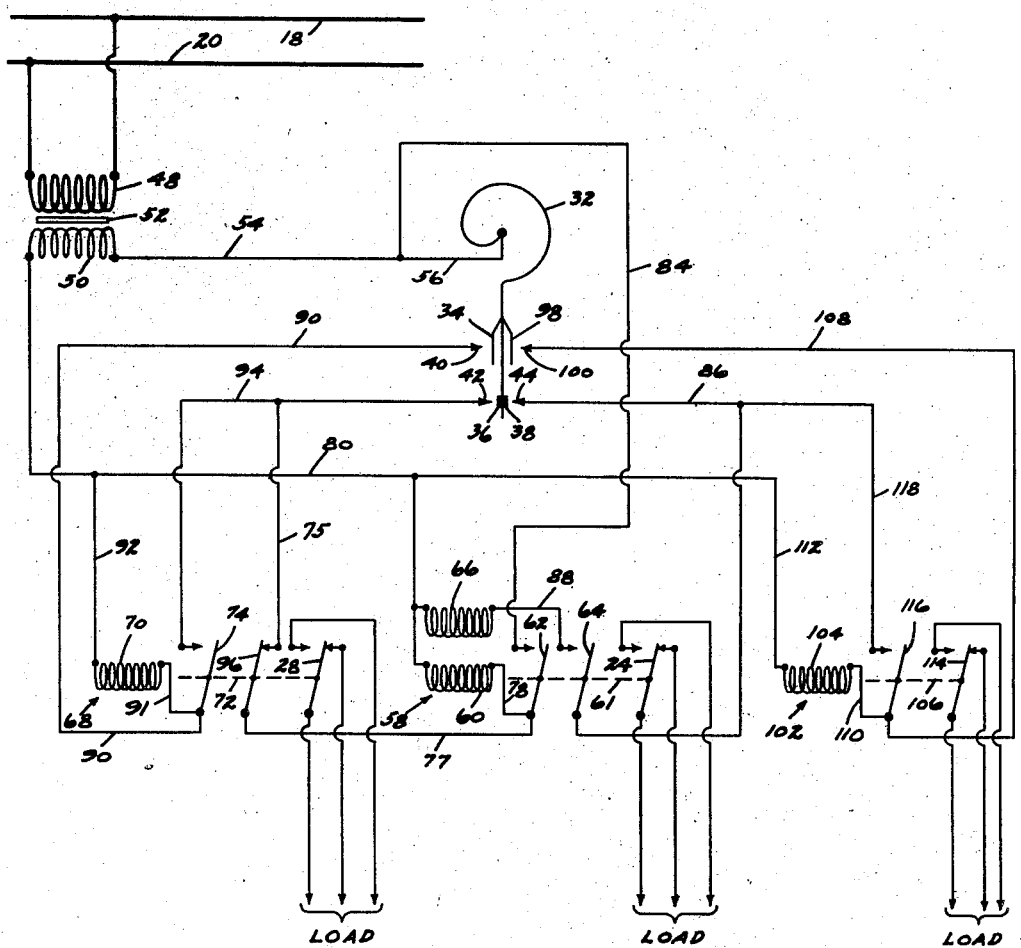
Fig. 3 shows still another modification of the circuit shown in Fig. 1.

Fig. 3 shows a control circuit, part of which is identical with the circuit shown in Fig. 2. In the circuit shown in Fig. 3, there is an additional relay controlled by the bi-metallic element through contacts 98 and 100, contact 98 being carried by the thermostat in a manner similar to that in which contact 34 is carried and being adapted to make connection with contact 100 only after contacts 38 and 44 have engaged and the thermostat continues to move to the right.

Assuming that the temperature rises and moves the stem 46 to the right of the position shown in Fig. 3, relay 58 will be de-energized, provided it was previously energized, when contacts 38 and 44 come into engagement. Relay 102, which is provided with relay coil 104 and armature 106, will remain de-energized until the contacts 98 and 100 come into engagement whereupon the following circuit for initially energizing relay 102 will be set up: secondary of transformer 50, wire 54, wire 56, bi-metallic element 32, contact 98, contact 100, wire 108, wire 110, relay coil 104, wire 112, wire 80, secondary 50. When the relay 102 is energized its armature will be moved to the left so that switch 114 will be closed across its left contact and switch 116 will be moved from open into closed position. Upon closure of switch 116 the following holding circuit will be set up for relay 102: secondary of transformer 50, wire 54, wire 56, bi-metallic element 32, contact 38, contact 44, wire 86, wire 118, switch 116, wire 110, relay coil 104, wire 112, wire 80, secondary of relay 50. This holding circuit will be broken and relay 102 will be de-energized as soon as contacts 38 and 44 separate upon movement of the bimetallic element to the left. As a consequence, armature 106 will move to the right and switch 114 will be closed across its right contact whereas switch 116 will be opened. The double contact switch 114 may be used to control any desired element.

The double contact switches of Fig. 3 may be replaced by the single contact switches of Fig. 1. The arrangement of Fig. 3 gives a 3-stage operation in both directions and if single switches are used at 28, 24, and 114, the latter may be arranged to close a circuit when coil 104 is de-energized so that a heating means or like device is constantly energized at a low value except when the temperature rises to such a high degree as to close 98–100 to energize 104. Obviously the arrangement of Fig. 3 can be used wherever 3-stage operation of any kind is desired.

The system shown in Fig. 2 gives a 2-stage control in both directions of movement of the thermostat, and may of course be used to control a heating device such as that shown in Fig. 1.

I claim as my invention:

1. In an electrical remote control system, a control member adapted to move back and forth along a predetermined path of travel in response to changes in a physical condition, a pair of controlled members each adapted to normally assume a fixed position of rest, electro-magnetic means for actuating each of said controlled members to a changed position, means associated with said control member for energizing the actuating means for one of said controlled members at one point in its path of travel, means associated with said control member for energizing the actuating means for the other controlled member at another point in its path of travel while maintaining the actuating means for the first said controlled member energized, and means associated with the control member for de-energizing each of said actuating means at a point in its path of travel different from that at which it was energized.

2. In an electrical remote control system, a control member adapted to move back and forth along a predetermined path of travel in response to changes in a physical condition, a plurality of controlled members each adapted to normally assume a fixed position of rest, separate electro-magnetic means for actuating each of said controlled members to a changed position and holding it therein, means associated with said control member for energizing the actuating means at different points in its path of travel, and means associated with the control member for de-energizing each of said actuating means at a point in its path of travel spaced from that at which it was energized.

3. In an electrical remote control system, a thermally responsive control member adapted to move back and forth along a predetermined path of travel, a plurality of controlled members each adapted to normally assume a fixed position of rest, separate electromagnetic means for actuating each of said controlled members to a changed position and holding it therein, means associated with said control member for energizing the actuating means at different points in its path of travel, and means associated with the control member for de-energizing each of said actuating means at a point in its path of travel different from that at which it was energized.

4. In an electrical remote control system, a thermally responsive control member adapted to move back and forth along a predetermined path of travel, a plurality of switches normally open, separate electro-magnetic means for closing each of said switches, means associated with said thermally responsive control member for energizing each of said closing means at different points in its path of travel, and additional means associated with said control member for de-energizing each of said closing means at a different point in its path of travel from that at which it was energized.

5. In an electrical remote control system, a thermally responsive control member adapted to move back and forth along a predetermined path of travel, a plurality of switches, a plurality of relays adapted to open and close said switches, means associated with the control member for energizing each of said relays at a separate point in its path of travel, and additional means associated with the control member for de-energizing each of said relays at a point in its travel different from that at which the relay was initially energized.

6. In an electrical remote control system, a control member adapted to move in two directions along a fixed path of travel between two end limits, a first controlled member, a second controlled member, each of said controlled members having a normal position of rest, separate electrically operable means for actuating each of said controlled members to a changed position and holding it therein while energized, means associated with the control member for energizing the actuating means for the first controlled member at a first point in its path of travel, means associated with the control member for energizing the actuating means for the second controlled member at a second point in its path of travel, means associated with the control member for de-energizing the actuating means for the second control member at the first said point upon movement of the controlled member from the second to the first point, and means for de-energizing the actuating means for said first controlled member when the control member reaches a third point in its path, said first point lying between said second and third points.

7. In an electrical remote control system, a first relay adapted to assume an open position when de-energized, a second relay also adapted to assume an open position when de-energized, a circuit for initially energizing the first said relay, a holding circuit for the first relay, a circuit for initially energizing the said second relay, a holding circuit for the second relay, a control member adapted to move along a predetermined path of travel, means associated with the control member for closing the circuit initially energizing the first relay at a first point in its travel, means associated with the control member for closing the circuit initially energizing the second relay at a second point in its travel, and means associated with said control member for breaking the holding circuits of said relays.

8. In an electrical remote control system, a first relay adapted to assume an open position when de-energized, a second relay also adapted to assume an open position when de-energized, a circuit for initially energizing the first said relay, a holding circuit for the first relay, a circuit for initially energizing the said second relay, a holding circuit for the second relay, a control member adapted to move along a predetermined path of travel, means associated with the control member for closing the circuit initially energizing the first relay at a first point in its travel, means associated with the control member for closing the circuit initially energizing the second relay at a second point in its travel, and means associated with said control member for breaking the holding circuit of each of said relays at a point in its path of travel different from that at which its relay was initially energized.

9. In an electrical remote control system, a first relay adapted to assume an open position when de-energized, a second relay also adapted to assume an open position when de-energized, a circuit for initially energizing the first said relay, a holding circuit for the first relay, a circuit for initially energizing the said second relay, a holding circuit for the second relay, a control member adapted to move along a predetermined path of travel, means associated with the control member for closing the circuit initially energizing the first relay at a first point in its travel, means associated with the control member for closing the circuit initially energizing the second relay at a second point in its travel, and means associated with said control member for breaking each of said holding circuits at different points in its path of travel.

10. In an electrical remote control system, a first relay adapted to assume an open position when de-energized, a second relay also adapted to assume an open position when de-energized, a circuit for initially energizing the first said relay, a holding circuit for the first relay, a circuit for initially energizing the said second relay, a holding circuit for the second relay, a control member adapted to move along a predetermined path of travel, means associated with the control member for closing the circuit initially energizing the first relay at a first point in its travel, means associated with the control member for closing the circuit initially energizing the second relay at a second point in its travel, means associated with said control member for breaking the holding circuit for the second relay at the first said point in its travel, and means for breaking the holding circuit of the first said relay at a third point in its path of travel, said first point lying between said second and third points.

11. In an electrical remote control system, three relays each adapted to close when energized, a circuit for initially energizing each of said relays, a holding circuit for each of said relays, a control member adapted to move along a predetermined path of travel, means associated with the control member for separately closing each of the initial energizing circuits at three spaced points in its path of travel, and means associated with the control member for breaking the holding circuits of each of said relays.

12. In an electrical remote control system, a first relay, a circuit for initially energizing said first relay, a holding circuit for the first relay, a switch in said holding circuit adapted to be open when said relay is de-energized, a second relay, a circuit for initially energizing said second relay, a holding circuit for the second relay, a control member adapted to move along a predetermined path of travel, a first relay control switch adapted to be opened and closed by said control member, and a second relay control switch adapted to be opened and closed by said control member, the first relay control switch being in the circuit for initially energizing the first relay and the second relay control switch being in the circuit for initially energizing the second relay, the switch in the holding circuit of the first relay also being in the holding circuit for the second relay.

13. In an electrical remote control system, a first relay, a circuit for initially energizing said first relay, a holding circuit for the said relay, a switch in said holding circuit adapted to be open when said relay is de-energized, a second relay, a circuit for initially energizing said second relay, a holding circuit for the second relay, a switch in the holding circuit for the second relay adapted to be open when said relay is de-energized, a control member adapted to move along a predetermined path of travel, a first relay control switch adapted to be opened and closed by said control member, and a second relay control switch adapted to be opened and closed by said control member, the first relay control switch being in the circuit for initially energizing the first relay and the second relay control switch being in the circuit for initially energizing the second relay, the switch in the holding circuit of the first relay also being in the holding circuit for the second relay, said holding circuit for the first relay being independent of said relay control switches.

14. In an electrical remote control system, a first relay, a circuit for initially energizing said first relay, a holding circuit for the said relay, a switch in said holding circuit adapted to be open when said relay is de-energized, a second relay, a circuit for initially energizing said second relay, a holding circuit for the second relay, a switch in the holding circuit for the second relay adapted to be open when said relay is de-energized, a control member adapted to move along a predetermined path of travel, a first relay control switch adapted to be opened and closed by said control member, and a second relay control switch adapted to be opened and closed by said control member, said first relay control switch being in the circuit for initially energizing the first relay and also being in the holding circuit for the second relay, said second relay control switch being in the circuit for initially energizing the second relay.

15. In an electrical remote control system, a first, second and third relay, circuits for initially energizing each of said relays, a holding circuit for each of said relays, a switch in each of said holding circuits adapted to open and close with the relay, a coil for neutralizing the first relay, an energizing circuit for said neutralizing coil, a control member adapted to move along a predetermined path of travel, and first, second, third and fourth relay control switches arranged to be opened and closed by said control member, the first, second and fourth relay control switches being in the circuits for initially energizing the first, second and third relays respectively and the third relay control switch being in the energizing circuit for said neutralizing coil, said first relay control switch also being in the holding circuit of the second relay.

16. In an electrical remote control system, a first, second and third relay, circuits for initially energizing each of said relays, a holding circuit for each of said relays, a switch in each of said holding circuits adapted to open and close with the relay, a coil for neutralizing the first relay, an energizing circuit for said coil, a control member adapted to move along a predetermined path of travel, and first, second, third and fourth relay control switches arranged to be opened and closed by said control member at different points in its path of travel, the first relay control switch being in the circuit for initially energizing the first relay and in the holding circuit for the second relay, said second and fourth relay control switches being in the circuits for energizing the second and third relays respectively, the third relay control switch being in the energizing circuit for said neutralizing coil.

17. In an electrical remote control system, a control member adapted to move back and forth along a predetermined path of travel, a first controlled member, a second controlled member, each of said controlled members having a normal position of rest, electrically operable means for actuating each of said controlled members to a changed position and holding it therein while energized, means associated with the control member for energizing the actuating means for the first controlled member at a first point in its path of travel, means associated with the control member for energizing the actuating means for the second controlled member at a second point in its path of travel, and means associated with the control member for de-energizing the actuating means for said first controlled member and for said second controlled member when the control member reaches a third point in its path, said first point lying between said second and third points.

18. In an electrical remote control system, a control member adapted to move back and forth along a pre-determined path of travel in response to changes in a physical condition, a plurality of controlled members, electrically operated means for actuating each of said controlled members, means associated with said control member for energizing the electrically operated actuating means for one of said controlled members at one point in its path of travel, means associated with the control member for energizing the electrically operated actuating means of another controlled member at another point in its path of travel while maintaining the actuating means for the first said controlled member energized, and means associated with the control member for neutralizing the electrically operated actuated means for one of said controlled members.

19. In an electrical remote control system, a control member adapted to move back and forth along a predetermined path of travel in response to variations of a physical condition, a first controlled member, a second controlled member, each of said controlled members having a normal position of rest, electrically operable means for actuating each of said controlled members to a changed position and holding it therein while energized, means associated with the control member for energizing the actuating means for the first controlled member at a first point in its path of travel, means associated with the control member for energizing the actuating means for the second controlled member at a second point in its path of travel, means associated with the control member for de-energizing the actuating means for the second control member at the first said point upon movement of the control member from the second to the first point, and means for neutralizing the actuating means for said first controlled member when the control member reaches a third point in its path, said first point lying between said second and third points.

20. In an electrical remote control system, a control member adapted to move back and forth along a predetermined path of travel, a first controlled member, a second controlled member, each of said controlled members having a normal position of rest, electrically operable means for actuating each of said controlled members to a changed position and holding it therein while energized, means associated with the control member at a first point in its path of travel for energizing the actuating means for the first controlled member, means associated with the control member for energizing the actuating means for the second controlled member at a second point in its path of travel, and means associated with the control member for neutralizing the actuating means for said first controlled member and for de-energizing the actuating means for said second controlled member when the control member reaches a third point in its path, said first lying between said second and third points.

21. A system of the class described, comprising, in combination, a control member adapted to move back and forth along a predetermined path of travel in response to changes in a physical condition, a pair of controlled members each adapted to normally assume a fixed position of rest, separate means for actuating each of said controlled members to a changed position, means associated with said control member for operating the actuating means for one of said controlled members at one point in its path of travel to cause its controlled member to be moved to a changed position, means associated with said control member for operating the actuating means for the other controlled member at another point in its path of travel to cause its controlled member to be moved to a changed position while maintaining the first controlled member in its new position, and means associated with the control member for operating said actuating means to allow said controlled members to return to their normal positions at a point in its path of travel different from that at which said actuating means were operated to move the controlled members to their changed positions.

22. A system of the class described, comprising, in combination, a control member adapted to move back and forth along a predetermined path of travel in response to changes in a physical condition, a pair of controlled members each adapted to assume a fixed position of rest, separate electrical means for actuating each of said controlled members to a changed position, means associated with said control member for energizing the electrical actuating means for one of said controlled members at one point in its path of travel to move it to its changed position, means associated with said control member for energizing the electrical actuating means for the other controlled member at another point in its path of travel while maintaining the first said controlled member in its changed position, and means associated with the control member for de-energizing each of said electrical actuating means at a point in its path of travel different from that at which it was energized.

23. A temperature control system of the class described, comprising, in combination, a thermostatic control member adapted to move back and forth along a predetermined path of travel, a first electro-magnetic coil, a second electro-magnetic coil, a controlled member actuated by each of said electro-magnetic coils, means associated with said control member for energizing one of said electro-magnetic coils at one point in its path of travel when traveling in one direction, means associated with the control member for energizing the other of the electro-magnetic coils upon further travel of the control member in the same direction, holding circuits for both said electro-magnetic coils, a neutralizing coil for one of said electro-magnetic coils, means associated with said control member and including a neutralizing coil for interrupting the holding circuits of said electro-magnetic coils upon travel of the control member in reverse direction, and a heater under the control of said controlled members.

24. A system of the class described, comprising, in combination, a control member movable back and forth along a predetermined path of travel, first and second control switches sequentially closed thereby upon movement thereof in one direction, a third control switch closed thereby upon movement thereof in the opposite direction after said second and first switches have been sequentially opened, a first electro-magnetic coil, an energizing circuit therefor controlled by said first control switch, a second electro-magnetic coil, an energizing circuit therefor controlled by said second control switch, switching mechanism moved to closed position by said first electro-magnetic coil when energized, a holding circuit for the first electro-magnetic coil controlled by said switching mechanism, a neutralizing coil for neutralizing the first electro-magnetic coil, an energizing circuit for the neutralizing coil controlled by the third control switch and said switching mechanism, and means for de-energizing said second electro-magnetic coil at a point in the path of travel of the control member removed from that at which said coil was energized.

25. A system of the class described, comprising, in combination, a control member movable in reverse directions, first and second control switches sequentially closed thereby upon movement thereof in one direction, said second control switch opening first upon movement of the control member in the reverse direction and the first control switch opening thereafter, a third control switch closed by said control member upon continued movement of said control member in the reverse direction and after said second and first control switches have been opened, a first electrically operable device, switching means moved to closed position thereby when energized, a second electrically operable device, a holding switch moved to closed position thereby when energized, an energizing circuit for the first electrically operable device controlled by said first control switch, a holding circuit for the first electrically operable device controlled by said switching means only, an energizing circuit for the second electrically operable device controlled by said second control switch, a holding circuit for the second electrically operable device including only said holding switch and switching means, a neutralizing means for neutralizing said first electrically operable device, and an energizing circuit for said neutralizing means controlled by said third control switch and said switching means.

26. A system of the class described, comprising, in combination, a control member movable in reverse directions, first and second control switches sequentially closed thereby upon movement thereof in one direction, said second control switch opening first upon movement of the control member in the reverse direction and the first control switch opening thereafter, a third control switch closed by said control member upon continued movement of said control member in the reverse direction and after said second and first control switches have been opened, a first relay coil, first and second relay switches controlled thereby, a second relay coil, a third relay switch controlled thereby, an energizing circuit for the first relay coil controlled by said first control switch, a holding circuit for the first relay coil controlled by the first relay switch, an energizing circuit for the second relay coil controlled by said second control switch, a holding circuit for the second relay coil controlled by the first and third relay switches in series, a neutralizing coil for neutralizing the first relay coil, and an energizing circuit for the neutralizing coil controlled by said third control switch and the second relay switch in series.

27. A system of the class described, comprising, in combination, a first relay coil, first and second relay switches moved to closed position thereby when energized, a second relay coil, a third relay switch moved to closed position thereby when energized, a control member movable in reverse directions, first and second control switches sequentially moved to closed position thereby upon movement thereof in one direction, a third control switch movable to closed position upon reverse movement thereof while said second and first control switches are open, an energizing circuit for the first relay coil dominated by said first control switch, a holding circuit for said first relay coil controlled only by the first relay switch, an energizing circuit for the second relay coil dominated by the second control switch, a holding circuit for the second relay coil controlled by the third relay switch and the first control switch in series, a neutralizing coil for the first relay coil and an energizing circuit for the neutralizing coil controlled by the second relay switch and the third control switch in series.

FRANCIS FILLO.